L. W. HESSING.
MACHINE FOR MAKING PACKING.
APPLICATION FILED AUG. 30, 1920.
1,388,428.
Patented Aug. 23, 1921.
3 SHEETS—SHEET 2.
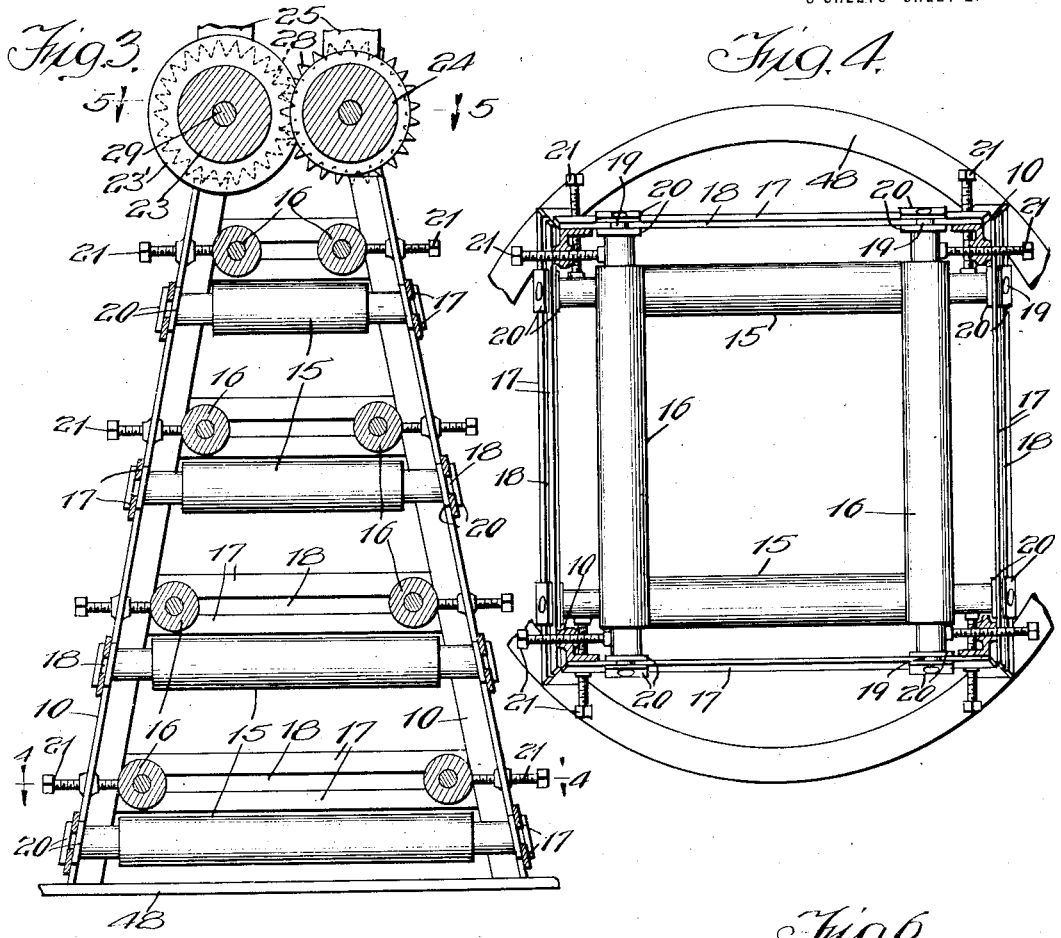
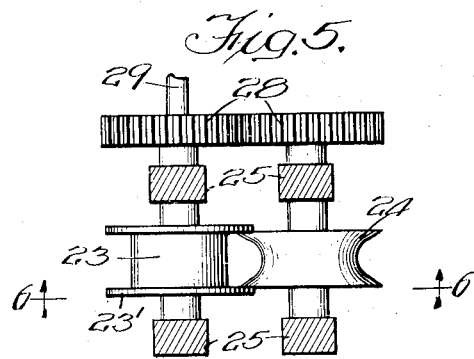
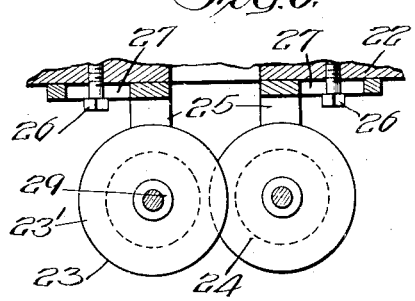
Witnesses:
W. F. Kilroy
Harry R. White
Inventor:
Lawrence W. Hessing
By Hiee & Hiee Attys

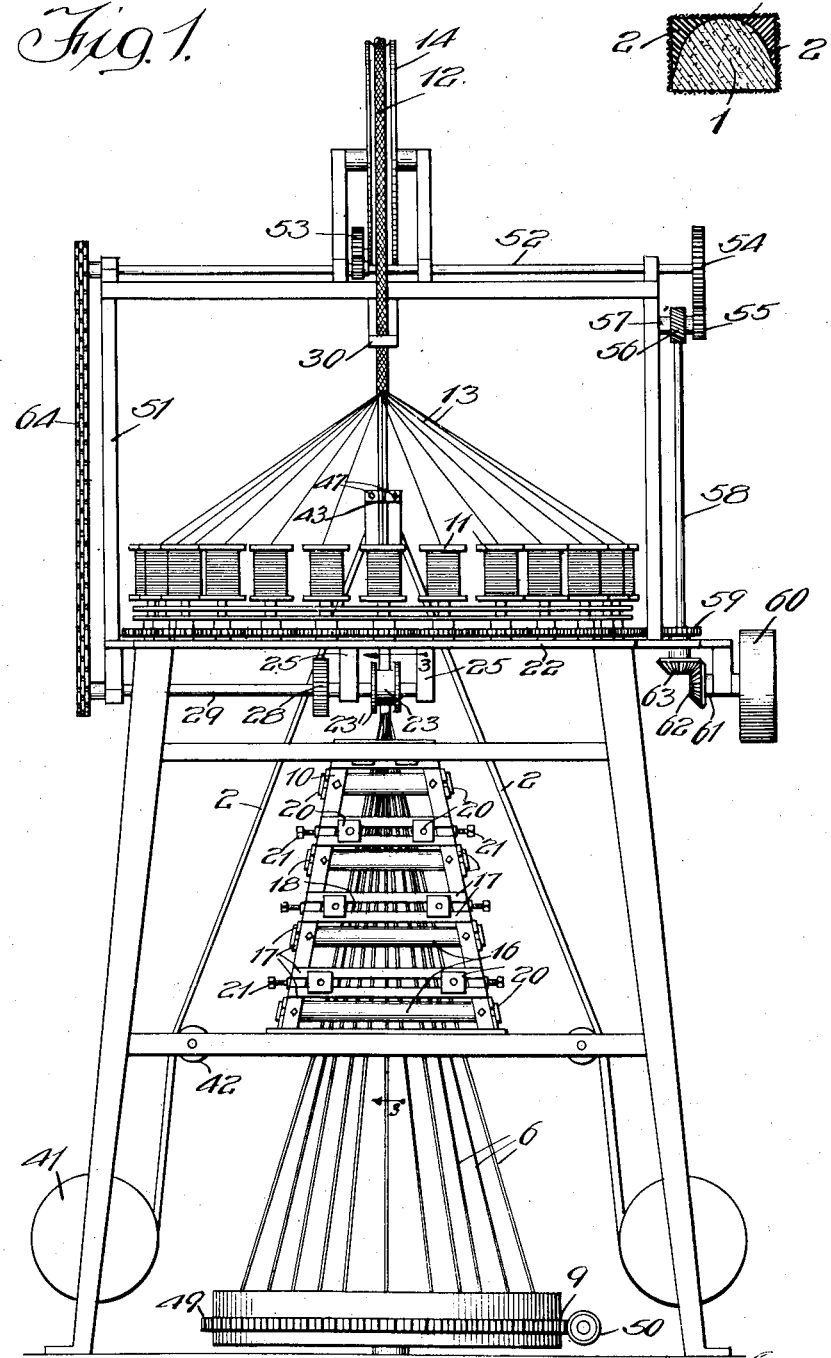

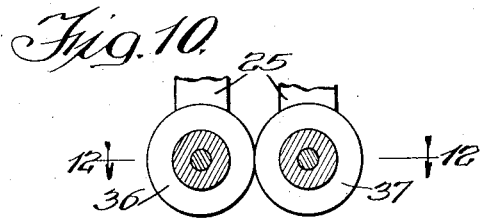
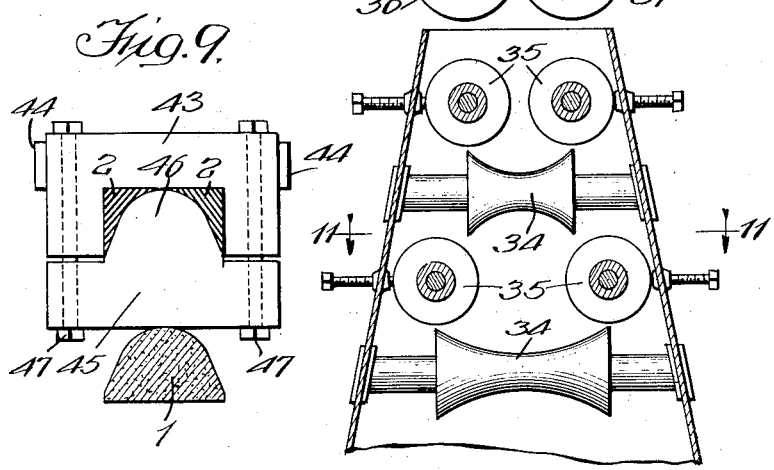
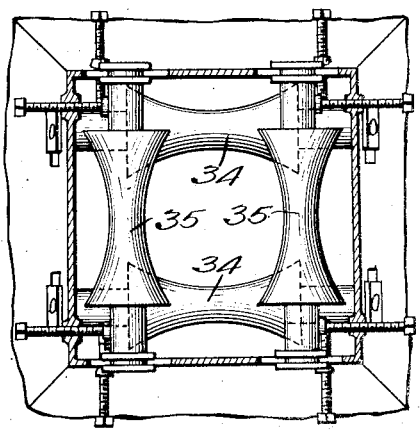
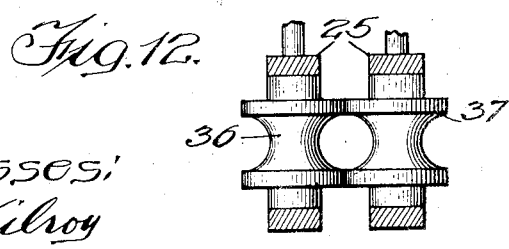

UNITED STATES PATENT OFFICE.

LAWRENCE W. HESSING, OF MAYWOOD, ILLINOIS, ASSIGNOR OF ONE-HALF TO JOHN M. RHODES, OF CHICAGO, ILLINOIS.

MACHINE FOR MAKING PACKING.

1,388,428.   Specification of Letters Patent.   Patented Aug. 23, 1921.

Application filed August 30, 1920. Serial No. 407,011.

*To all whom it may concern:*

Be it known that I, LAWRENCE W. HESSING, a citizen of the United States, residing at Maywood, in the county of Cook and State of Illinois, have invented certain new and useful Improvements in a Machine for Making Packing, of which the following is a description.

My invention belongs to the class of devices for making packing, particularly the type of packing for preventing the leakage of fluids past pump rods, valve stems and the like, although the same may be used wherever found applicable for making any other style of packing. The invention has among its objects the production of a machine of the kind described which is simple, convenient, reliable, durable, efficient and satisfactory. It has particularly as an object the production of a machine suitable for making up packing in strips, the body of which packing is composed of metal foil or wires such as Babbitt metal, lead or the like, of the desired size and shape, which is inclosed in a suitable wrapping or cover, preferably a woven wire or braided cover. If desired a rubber back may be incorporated and inclosed in the braided cover. Many other objects and advantages of the construction herein shown and described will be obvious to those skilled in the art from the disclosure herein given.

To this end, my invention consists in the novel construction, arrangement and combination of parts herein shown and described, and more particularly pointed out in the claims.

In the drawings, wherein like reference characters indicate like or corresponding parts, Figure 1 is a view in elevation of my improved machine;

Fig. 2 is a sectional view of one type of packing which the machine is adapted to make;

Fig. 3 is a sectional view on line 3—3 of Fig. 1, showing the details of the shaping and forming mechanism;

Fig. 4 is a sectional view taken substantially on line 4—4 of Fig. 3;

Fig. 5 is a sectional view taken substantially on line 5—5 of Fig. 3;

Fig. 6 is a sectional view taken substantially on line 6—6 of Figs. 1 and 5;

Fig. 7 is a sectional view illustrating the foil spool container;

Fig. 8 is a detail view illustrating the roll adjusting members;

Fig. 9 is a detail view illustrating the backing guide;

Fig. 10 is a view similar to a portion of Fig. 3 illustrating a modified type of roll.

Fig. 11 is a sectional view taken substantially on line 11—11 of Fig. 10; and

Fig. 12 is a sectional view taken substantially on line 12—12 of Fig. 10.

Referring to the drawings, and particularly Fig. 2, the preferred type of packing which I make on the machine consists of a body part 1 of metal foil, such as lead, babbitt or the like in the form of thin ribbons, wires or bands or the like of the desired size and shape. These may be extended parallel, be crimped, straight, twisted or braided, the same, however, being preferably coated or mixed with a lubricant, such as graphite, oil or the equivalent. In the particular type of packing shown, the same is provided with a rubber or equivalent packing 2, in one or more parts, the whole packing being formed and a covering 3 braided or otherwise applied around the same. However, it should be noted that the rubber may be omitted in so far as the present machine is concerned, and the braiding applied to the body 1, which may be of the desired size and shape.

In Fig. 1, I have illustrated the ribbons, strips or foils 6 extending from below the machine to the shaping and forming mechanism. The foil or strips may be supplied to the machine in any suitable manner. As illustrated, the same is supplied from spools 7 arranged in receptacles 8, which also preferably contain a lubricant such as graphite and oil, or the like. In Fig. 1, I have illustrated these receptacles arranged in a main receptacle 9, which may be arranged to be rotated or driven so that the strips are twisted together should this be desired. Arranged above the spools is the shaping and forming mechanism, this being preferably carried by a frame 10 or the equivalent, the same being substantially a frame work for carrying the various rolls, above which is arranged braiding mechanism carrying spools 11, supplying the covering material 13, preferably wire or the like, the completed packing 12 extending from the braiding mechanism over a roll or pulley 14, or the equivalent.

The shaping mechanism consists of the desired number of rolls 15 and 16 or the equivalent of suitable size and shape, and adjusted to properly shape the packing so that it may be easily and accurately formed as it passes through the forming rolls hereinafter described. The rolls 15 and 16 are preferably supported so that they may be adjusted as desired. As shown, the rolls 15 and 16 are mounted on supporting rods, which are formed to engage and be carried by the frame bars 17 or the equivalent, which are carried by the frame part 10, the bars 17 being spaced as indicated at 18. Obviously, by so mounting the rolls, the same may be relatively adjusted to the desired distances apart. They are maintained in the desired positions by means of screw members 21, which are constructed as at 21' to coöperate with the shafts. As will be most clearly shown by referring to Fig. 3, the rolls first receiving the foil are spaced a greater distance apart than the final rolls, so that as the strips pass through between the rolls they are gradually brought together, the successive rolls molding or shaping the body of the foil. The positions of the several rolls will depend upon the desired size of the finished product and the size and number of strips of foil passing between the rolls. The rolls may be power driven or not, as may be desired. As shown, the body passing through between the rolls 15 and 16 is substantially shaped up rectangularly, and after passing the last rolls, I preferably provide final forming and shaping or body finishing rolls which will accurately finally form the body and at the same time give it its final size and shape. For this purpose, I have shown the forming rolls 23 and 24 arranged to coöperate and form the material into the desired shape and size as desired. To shape the body substantially as shown in Fig. 2, I make the roll 23 straight and groove the roll 24. In the construction shown, I have provided the roll 23 with the flanges 23' arranged to overlie the sides of the roll 24. Obviously, the shape and sizes of these rolls, as well as their adjustment relative to each other, determines the size and shape of the body. I have illustrated rolls 23 and 24 carried by brackets 25 which are adjustably secured below the braiding mechanism. As shown, the same are secured on the base or bottom plate 22 by bolts 26 which are extended through slots 27 in the brackets. This permits a slight adjustment, and in this connection it will be obvious that an equivalent result may be obtained by changing or replacing one set of rolls by a smaller or larger set, as the case may be. I have shown roll 23 driven from a shaft 29, this same shaft being arranged to drive roll 24 through the gears 28. Obviously, any equivalent mechanism may be employed.

After leaving the rolls 23 and 24, the formed body passes to and through the braiding mechanism, by means of which a braided cover or wrapper is applied to the body either before or after the application of the rubber where a rubber backing is employed. As shown, the braiding material 13, of suitable material, preferably copper wire, is supplied from the spools 11. I have not considered it necessary to illustrate the braiding mechanism in detail, as the particular braiding mechanism forms no part of the invention in itself, and any equivalent wrapping or covering mechanism may be employed. In the device shown, the spools are mounted on a plate and driven about the plate around the body of packing by means of suitable gearing and other mechanism so that there is a braiding or weaving of the cover about the packing. I prefer to use a wire material such as soft copper or the like for braiding purposes, but this of course depends upon the desired finished product. After leaving the braiding mechanism, the same passing through the guide 30, passes over the wheel 14, where it may be drawn off and coiled or otherwise taken care of. The same may be made in any desired length.

Where the packing is to be made with the rubber backing, the same may be fed to the body in any desired manner. In the construction shown, the back 2 is in two parts, and may be supplied in any suitable manner. I have illustrated the same supplied from spools 41 and fed over rolls 42 or the equivalent to the body between the forming rolls and the point where the braiding is applied. I have illustrated a guide in Fig. 1 which consists of a part 43 carried by the members 44 from the braiding machine, 45 being a coöperating part having a part 46 for separating and guiding the two parts of the rubber back onto the body. Obviously, the construction and shape of these parts will depend upon the style of backing applied.

It was mentioned before that the body might be constructed of foil of the desired size and shape and the foil twisted or otherwise manipulated. I have illustrated, as before mentioned, the foil spools arranged in a container or support 9. This may be arranged to be power driven so that the strands or foils are twisted as they are fed in between the rolls. In the construction shown, the part 9 is formed with a gear 49 arranged to mesh with the gear 50, driven in any suitable manner. I preferably provide adjacent the lower ends of the frame members 10, and as shown carried by the frame members 10, a ring 48 which serves as a guide to the frame, and which is particularly desirable where there are many strands of foil and the spools are set some distance from the center of the machine. This prevents sharp bends of the foil and tends to prevent breaking at this point, the ring being preferably rounded.

The shaping construction shown in Figs. 10, 11 and 12 is substantially similar, except that in this case I provide rolls 34 and 35 which are arranged to substantially form the body round, the rolls being grooved or rounded so as to gradually shape the body. The final forming or finishing rolls 36 and 37 in this case are formed to finally press or shape the body in the desired form. Obviously, the machine may be constructed to produce any desired shape of body, rectangular, round, triangular, or special forms, for example as shown in Fig. 2.

The forming rolls as well as the pulley or roll 14 are preferably so timed with the braiding mechanism and with each other so as to produce a uniform product of the desired construction. I have illustrated the forming mechanism or rolls driven by the same driving mechanism for the braiding machine. As shown, 52 is a shaft carried by uprights 51 and arranged to drive wheel 14 through a gear 53 and coöperating mechanism. Shaft 52 is driven through the gearing 54, 55 and 56, shafts 57 and 58 and gears 62 and 63, 61 being a shaft for driving gear 62 and is driven by pulley 60 or equivalent means. Shaft 58 is arranged to drive a gear 59, operatively connected with the gears of the braiding machine, as before mentioned, and which need not be described in detail herein. In the construction shown, shaft 29, which drives the forming rolls, is driven through a sprocket chain 64 and suitable sprocket wheels or equivalent connecting mechanism. Obviously, with this construction, wheel 14 and the forming rolls will operate in conjunction, and be properly timed and the braid will be applied to the body in a predetermined manner and evenly and efficiently.

When it is desired to change the shaping rolls in the construction shown, the entire frame consisting of members 10 and bar 17 may be removed as a unit, the same not requiring the disassembling and changing of the rolls, as a new frame and the desired rolls may be positioned within a minimum of time. The forming rolls may also be easily changed.

It will be noted by referring to Fig. 2, that to produce the packing shown in Fig. 2 the cover is braided about the body and rubber. In this case I apply the rubber 2 or the equivalent, which may be of the desired size and shape, to the body after the same has left the final shaping and forming rolls and before the cover is braided over the same. Where it is desired to braid the body separately, the rubber may be omitted, and if desired, the formed and covered body and rubber may be passed through another braiding machine or through braiding mechanism associated with the mechanism illustrated, and another covering braided about the completed article. In the operation of the machine, it will be seen that the foil or strips are fed through the forming mechanism and pressed or worked in substantially to the desired shape. The same, however, is gradually formed so that the metal foil, which is ordinarily of soft and low tensile strength, is not broken. The gradual shaping of the body also produces a more even product and a more even running machine.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a machine of the kind described and in combination, means for supplying strands of metallic packing material to the machine, means for initially guiding said strands into a compact body, means for forming and sizing the body, means for applying a backing to said body, and means for braiding a covering about the body and backing.

2. In a machine of the kind described and in combination, means for carrying and supplying strands of metallic packing material, and means for drawing said material through the machine, means for substantially compressing and shaping the strands to produce a body, means for forming the body to produce the desired shape, and means between said forming mechanism and said drawing means for covering the body, said forming means being intermediate said covering means and initial and compressing and shaping means.

3. In a machine of the kind described and in combination, means for carrying and supplying strands of packing material, and means for drawing said material through the machine, means for substantially compressing and shaping the strands to produce a body, means for forming the body to produce the desired shape, means for applying a backing material to the body, and means between said forming mechanism and said drawing means for covering the body and backing material.

4. In a machine of the kind described and in combination, means for initially shaping a body of packing material, mechanism for forming said body to the desired size and shape, means for applying a braided cover on the body, said forming mechanism being intermediate said covering and initial shaping means, mechanism for drawing the covered body through the forming means and braiding mechanism, and means for driving said drawing mechanism, said forming means and said braiding mechanism in unison.

5. In a machine of the kind described and in combination, a material container, means for coating the material carried therein, a plurality of sets of coöperating shaping rolls, a pair of coöperating forming rolls, means for applying a rubber backing to the coated, formed product, and means for covering the backed product.

6. In a machine of the kind described and in combination, means for twisting together a plurality of strands of material, a series of opposed compression rolls disposed to successively operate on the material, a plurality of coöperating forming rolls, and means for applying a cover about the formed product.

7. In a machine of the kind described and in combination, a material container adapted to contain a plurality of strands of material, means for coating the material carried therein, means for controlling said container for twisting together said plurality of coated strands, a plurality of sets of coöperating shaping rolls, a pair of coöperating forming rolls, means for applying a rubber backing to the coated, formed product, and means for covering the backed product.

8. In a machine of the kind described and in combination, a main frame, means for carrying spools containing strands of suitable material arranged adjacent the lower part of said frame, a plurality of sets of coöperating successively acting shaping rolls, a frame for carrying said rolls removably arranged in said main frame, a pair of coöperating final forming rolls arranged above said shaping rolls, means adjacent the upper part of said frame for drawing the formed material through said shaping and forming rolls, and means for braiding a covering over said body after the same passes the forming rolls.

9. In a machine of the kind described and in combination, a frame, means for carrying spools containing strands of suitable material arranged adjacent the lower part of said frame, a plurality of sets of adjustable coöperating successively acting shaping rolls, a detachable frame for carrying said rolls arranged in said main frame, a pair of adjustable coöperating final forming rolls arranged above said shaping rolls, means adjacent the upper part of said frame for drawing the formed material through said shaping and forming rolls, and mechanism for braiding a covering over said body after the same passes the forming rolls.

10. In a machine of the kind described and in combination, a plurality of material spools, means for carrying said spools and applying a suitable coating to the material carried thereby, drawing means mounted above said spools, said material extended from the spools to said drawing means, means mounted above said spools for initially shaping the body formed of said material, means for controlling said carrying means for twisting the strands of material, means for guiding the material to said shaping means, means for forming the body after the same has passed through the shaping means, means for applying a backing to the body after the same has passed said forming means, and means for applying a cover to the formed body and backing, and means for driving said drawing means, said covering means and said forming means in unison.

11. In a machine of the kind described and in combination, a plurality of material spools, means for carrying said spools and applying a suitable coating to the material carried thereby, drawing means mounted above said spools, said material extended from the spools to said drawing means, means mounted above said spools for initially shaping the body formed of said material, means for controlling said carrying means and twisting the strands of material, means for guiding the material to said shaping means, means for forming the body after the same has passed through the shaping means, including rolls, one roll flanged to overlie the sides of the other, means for applying and guiding a backing to the body after the same has passed said forming means, and means for applying a cover to the formed body and backing, and means for driving said drawing means, said covering means and said forming means in unison.

In testimony whereof, I have hereunto signed my name in the presence of two subscribing witnesses:

LAWRENCE W. HESSING.

Witnesses:
 Roy W. Hill,
 Bertha Hartmann.